United States Patent
Kuratani et al.

(10) Patent No.: US 12,156,248 B2
(45) Date of Patent: Nov. 26, 2024

(54) WIRELESS COMMUNICATION ACCEPTANCE METHOD AND COMMUNICATION SYSTEM USING THE METHOD

(71) Applicant: Murata Machinery, Ltd., Kyoto (JP)

(72) Inventors: Yasuhiro Kuratani, Inuyama (JP); Ryuji Shimoji, Kyoto (JP); Masao Kawasaki, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 294 days.

(21) Appl. No.: 17/916,133

(22) PCT Filed: Mar. 1, 2021

(86) PCT No.: PCT/JP2021/007646
§ 371 (c)(1),
(2) Date: Sep. 30, 2022

(87) PCT Pub. No.: WO2021/199829
PCT Pub. Date: Oct. 7, 2021

(65) Prior Publication Data
US 2023/0134204 A1    May 4, 2023

(30) Foreign Application Priority Data
Apr. 1, 2020 (JP) ................. 2020-065723

(51) Int. Cl.
*H04W 74/06* (2009.01)
*H04W 76/10* (2018.01)

(52) U.S. Cl.
CPC ........... *H04W 74/06* (2013.01); *H04W 76/10* (2018.02)

(58) Field of Classification Search
CPC ....... B61L 15/00; H04W 84/00; H04W 76/10; H04W 74/06
See application file for complete search history.

(56) References Cited

U.S. PATENT DOCUMENTS 5,506,847 A * 4/1996 Shobatake ......... H04Q 11/0478
370/408
5,896,561 A * 4/1999 Schrader ............... H04L 1/0025
370/545

(Continued)

FOREIGN PATENT DOCUMENTS

JP    S63-67780 A    3/1988
JP    H08-256148 A   1/1996

(Continued)

OTHER PUBLICATIONS

International Search Report dated May 11, 2021 in counterpart International Application No. PCT/JP2021/007646.

(Continued)

*Primary Examiner* — Hassan A Phillips
*Assistant Examiner* — Prenell P Jones
(74) *Attorney, Agent, or Firm* — DLA Piper LLP (US)

(57) ABSTRACT

A communication system includes a communication management unit, an access point, and a plurality of traveling vehicles. The access point is connected to the communication management unit. Each vehicle includes a wireless communication unit. The communication system performs wireless polling communication between the communication management unit and the plurality of traveling vehicles via the access point at each predetermined polling cycle. In the communication system, a process including a wireless communication object addition step is performed to accept a new traveling vehicle as an object of wireless communication.

7 Claims, 7 Drawing Sheets

(56) References Cited

U.S. PATENT DOCUMENTS

| | | | | |
|---|---|---|---|---|
| 2002/0167917 | A1* | 11/2002 | Stephenson | H04B 7/18508 |
| | | | | 370/449 |
| 2010/0291907 | A1* | 11/2010 | MacNaughtan | H04L 67/53 |
| | | | | 463/41 |
| 2018/0254869 | A1* | 9/2018 | Li | H04W 72/0446 |
| 2019/0273544 | A1* | 9/2019 | Cha | H04L 5/0091 |
| 2020/0322033 | A1* | 10/2020 | Sugaya | H04L 1/0061 |
| 2021/0044929 | A1* | 2/2021 | Ridgill, II | H04W 24/08 |
| 2021/0211182 | A1* | 7/2021 | Sugaya | H04B 7/0697 |
| 2022/0417796 | A1* | 12/2022 | Kitamura | H04L 1/0002 |

FOREIGN PATENT DOCUMENTS

| | | | |
|---|---|---|---|
| JP | 2005-236877 A | 9/2005 | |
| JP | 4360344 B2 | 11/2009 | |

OTHER PUBLICATIONS

Written Opinion dated May 11, 2021 in counterpart International Application No. PCT/JP2021/007646.

* cited by examiner

WIRELESS COMMUNICATION ACCEPTANCE METHOD AND COMMUNICATION SYSTEM USING THE METHOD

TECHNICAL FIELD

This disclosure relates primarily to wireless communication for moving vehicles. More particularly, it relates to a method of accepting a new moving vehicle into a wireless communication system as an object of wireless communication.

BACKGROUND

Conventionally, for example, a communication system that performs polling communication without wire (wireless polling communication) between a controller and a plurality of traveling carts under control is used in an automatic conveyance system. Japanese Patent No. 4360344 discloses this type of automatic conveyance system.

The automatic conveyance system (conveyance cart system) in JP '344 includes a controller and a cart controller. The cart controller is provided in a cart. The controller and the cart controller communicate with each other using a wireless polling method.

In the automatic conveyance system, a new cart is sometimes added later to increase the conveyance capacity or replace spare carts in case of failure. When adding a new cart to a conveyance cart system such as JP '344, it is necessary to make the communication system recognize the new cart as an object of the wireless polling communication.

As the general procedure for adding the new cart as the object of the wireless polling communication, for example, the following can be considered. The communication system continuously transmits beacons to detect the cart to be added at predetermined time intervals. When the cart receives the beacon, it acquires information on wireless communication from the received beacon and configures setting for the wireless communication.

It can also be considered that the cart continuously transmits beacons requesting the addition of itself at predetermined time intervals. In that instance, when the communication system receives the beacon, it acquires information about wireless communication from the received beacon and configures settings for the wireless communication.

In the conveyance cart system of JP '344, periodic wireless polling communication between the controller and the cart controller is performed almost without interruption at all times while the system is in operation. Therefore, if the beacons are continuously transmitted as described above to add a new cart, the wireless polling communication may be interfered and the stability of cart control may be compromised.

It could therefore be helpful to provide a new traveling cart as an object of wireless communication to the communication system while limiting its influence on the wireless polling communication already in place.

SUMMARY

We thus provide a wireless communication acceptance method which is a method of accepting a new traveling vehicle as an object of wireless communication into a communication system. The communication system includes a controller, an access point, and a plurality of traveling vehicles. The access point is connected to the controller. Each of the plurality of traveling vehicles includes a wireless communication unit. The communication system performs wireless polling communication between the controller and the plurality of traveling vehicles via the access point at each predetermined polling cycle. The wireless communication acceptance method performs processes including a wireless communication object addition step. In the wireless communication object addition step, a connection sequence for accepting the new traveling vehicle into the communication system is performed. The connection sequence accompanying wireless communication is performed within free time which is time after the wireless polling communication between the controller and the plurality of traveling vehicles is completed and until an end of a period during which the wireless polling communication is possible, in the polling cycle.

Thus, by performing the connection sequence for the new traveling vehicle during the free time when the wireless polling communication is not performed, the influence of the execution of the connection sequence on the wireless polling communication can be eliminated. It is also possible to have the communication system accept the new traveling vehicle with a simple operation.

Preferably, in this wireless communication acceptance method, a process including a connection availability determination step for determining whether or not the free time is longer than or equal to predetermined time is performed. If it is determined that the free time is longer than or equal to the predetermined time in the connection availability determination step, the wireless communication object addition step is performed. If it is determined that the free time is shorter than the predetermined time in the connection availability determination step, the wireless communication object addition step is not performed.

Accordingly, this can ensure that the performance of the connection sequence does not interfere with the wireless polling communication.

Preferably, in the wireless communication object addition step, the controller wirelessly transmits a frame to start the connection sequence via the access point within the free time.

Accordingly, this eliminates the need to input information for wireless communication (for example, identification information of the access point) into the new traveling vehicle in advance. Thus, input errors can be avoided and the operator's workload can be reduced.

Preferably, in the wireless communication object addition step, the controller transmits the frame to start the connection sequence depending on an acceptance command input by an operator.

Accordingly, this can avoid wasted transmissions in the absence of the new traveling vehicle since the frames are not transmitted in the absence of the operation of the operator.

Preferably, in the wireless communication object addition step, the new traveling vehicle wirelessly transmits a frame to start the connection sequence within the free time.

Accordingly, this eliminates the need to input information for wireless communication (for example, identification information of the new traveling vehicle) to the access point or the controller in advance. Thus, input errors can be avoided and the operator's workload can be reduced.

Preferably, in this wireless communication acceptance method, the new traveling vehicle performs a process including a free time estimating step. In the free time estimating step, the new traveling vehicle intercepts the wireless polling communication between the controller and the plurality of traveling vehicles and estimates the free time.

Accordingly, the new traveling vehicle can estimate the free time within which the wireless polling communication is not in progress. Thus, during the time when the wireless polling communication is not in progress, the new traveling vehicle can transmit the frame for entering to wireless communication. In other words, the wireless polling communication can avoid being interfered with by the transmission of the frame.

We also provide a communication system with the following configuration. That is, the communication system includes a controller, an access point, and a plurality of traveling vehicles. The access point is connected to the controller. Each of the plurality of traveling vehicles includes a wireless communication unit. In the communication system, the controller performs wireless polling communication via the access point at each predetermined polling cycle with a predetermined number of vehicles under its jurisdiction. A connection sequence accompanying wireless communication is performed for accepting wireless communication with a new traveling vehicle that is not included in the plurality of traveling vehicles that are objects of the wireless polling communication. In the polling cycle, the connection sequence is performed within free time which is time after the wireless polling communication between the controller and the plurality of traveling vehicles via the access point is completed and until an end of the polling cycle.

Thus, by performing the connection sequence for the new traveling vehicle during the free time when the wireless polling communication is not performed, the influence of the execution of the connection sequence on the wireless polling communication can be eliminated. It is also possible to have the communication system accept the new traveling vehicle with a simple operation.

Figure 1:
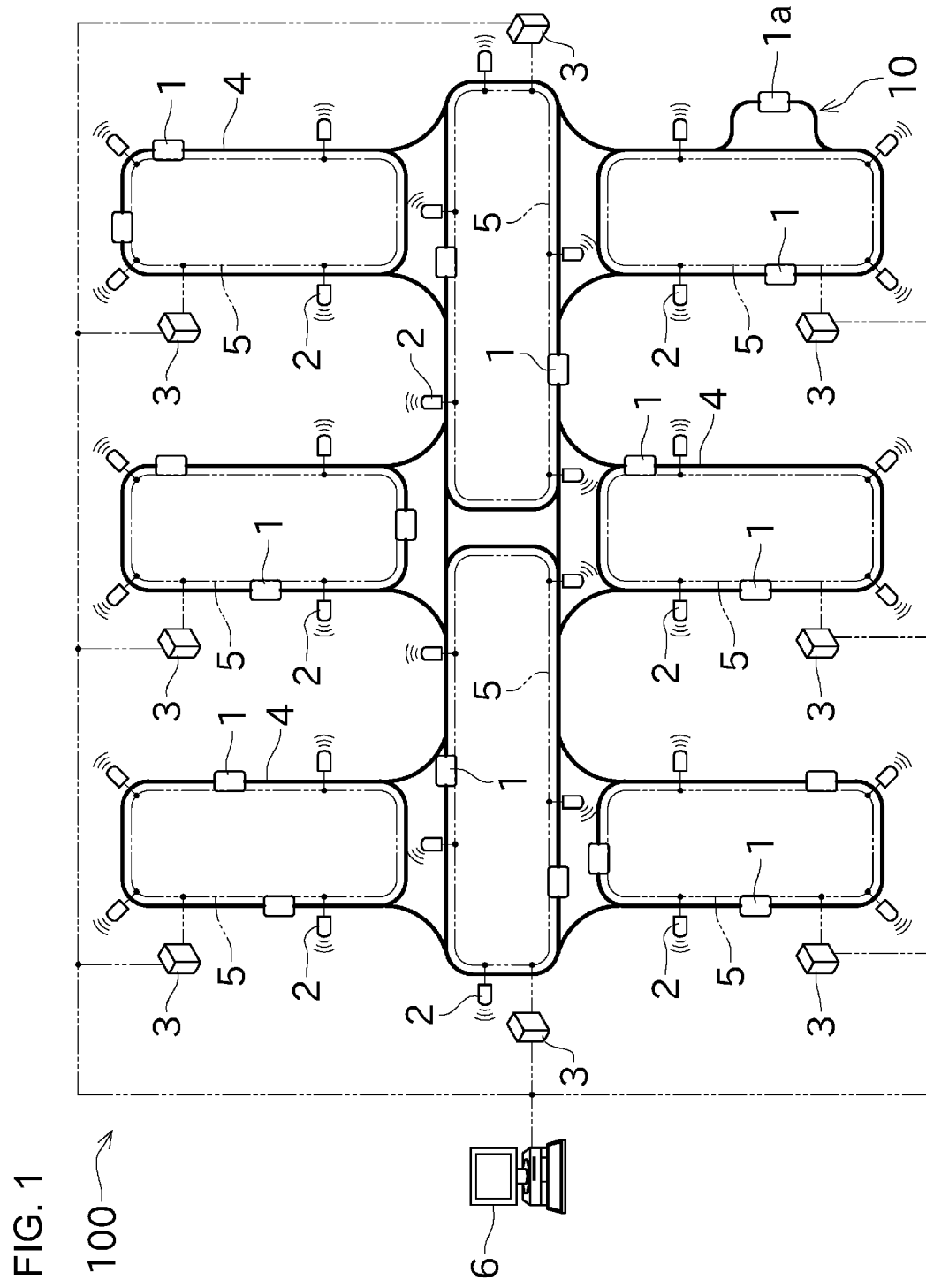
FIG. 1 is a diagram showing a configuration of a communication system according to a first example.

DESCRIPTION OF THE REFERENCE NUMERALS 1 traveling cart (traveling vehicle)
1a new traveling cart (new traveling vehicle)
2 access point
3 communication management unit (controller)

DETAILED DESCRIPTION

Figure 2:
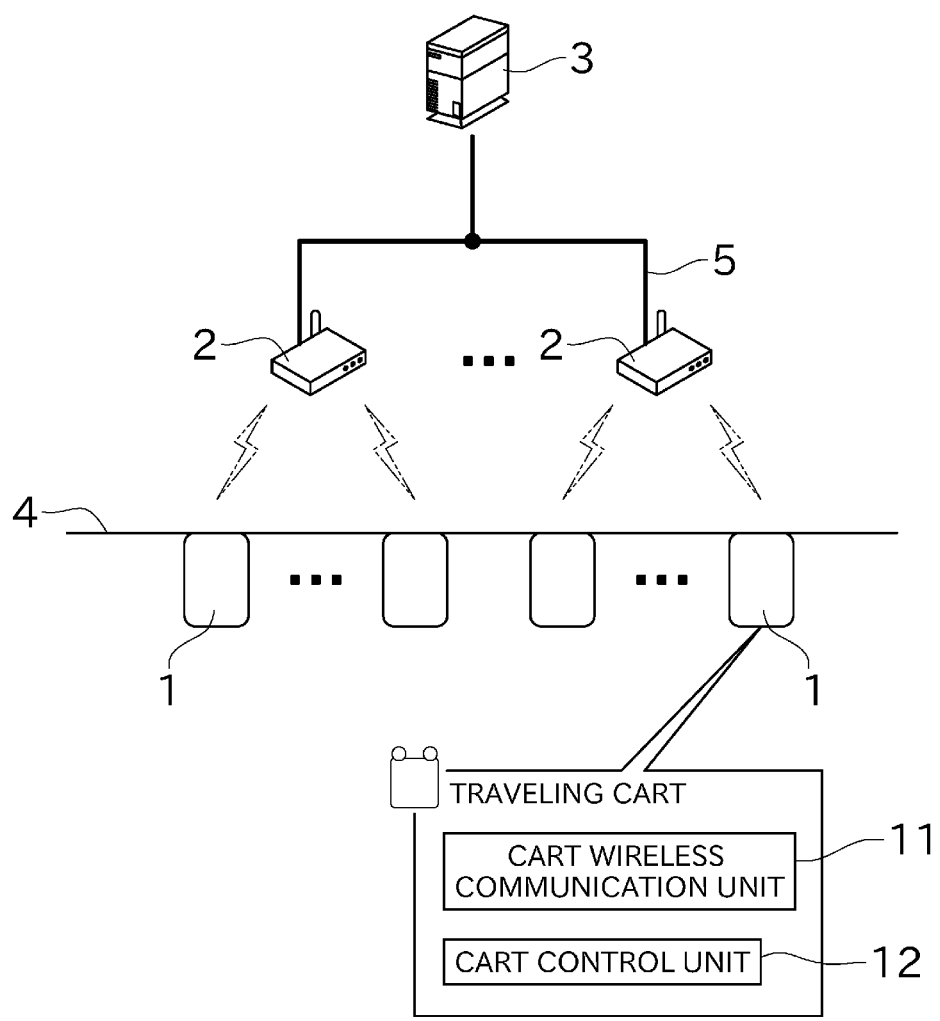
FIG. 2 is a schematic diagram showing a relationship between a communication management unit, access points, and traveling carts.
Figure 3:
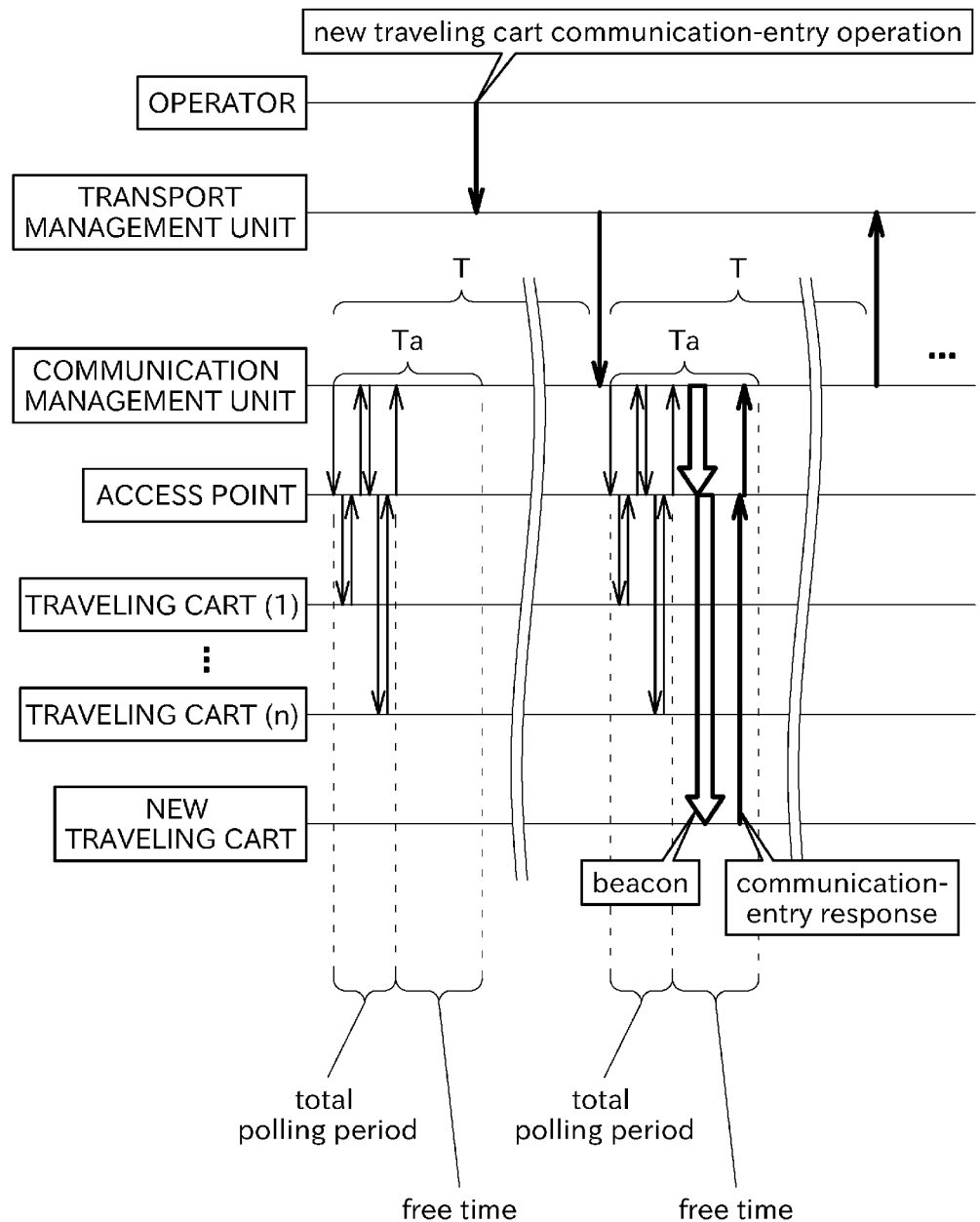
FIG. 3 is a timing chart showing transmission timing of a beacon for accepting a new traveling cart as an object of wireless communication.
Figure 4:
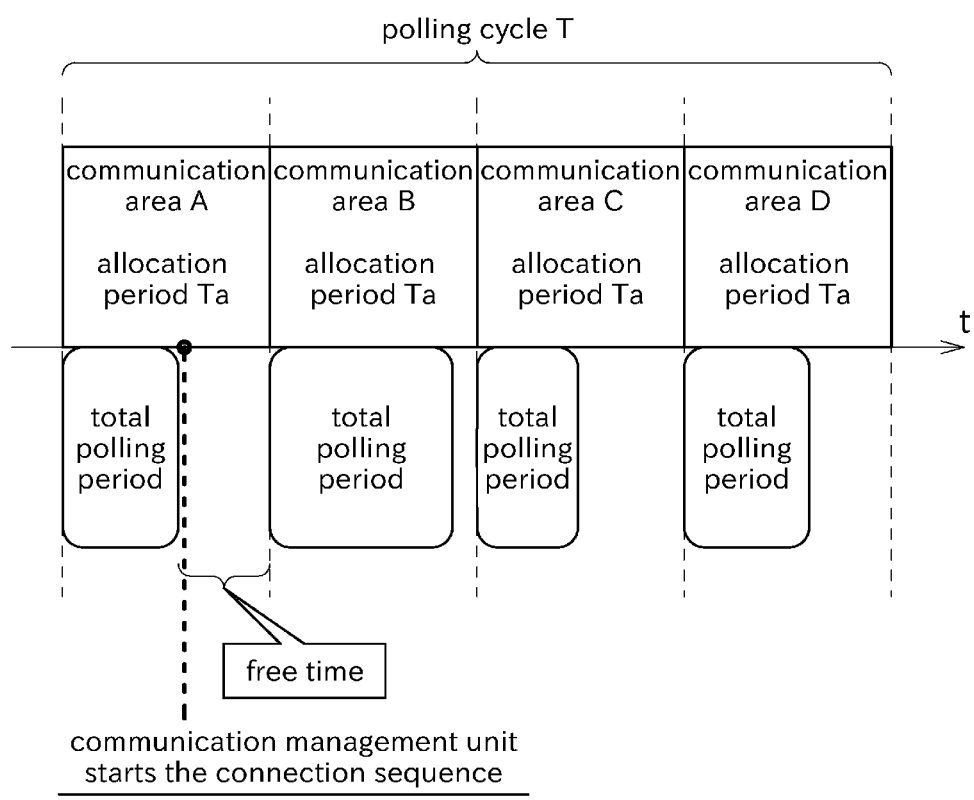
FIG. 4 is a diagram showing the relationship between free time for wireless polling communication and start timing of a connection sequence.

Next, an example of our systems and methods will be described with reference to drawings. FIG. 1 is a diagram showing a configuration of a communication system 100 according to a first example. FIG. 2 is a schematic diagram showing a relationship between a communication management unit 3, access points 2, and traveling carts 1. FIG. 3 is a timing chart showing transmission timing of a beacon for accepting a new traveling cart 1a as an object of wireless communication. FIG. 4 is a diagram showing the relationship between free time for wireless polling communication and start timing of a connection sequence about the access point 2 in a communication area A among the four communication areas A to D under a jurisdiction of the communication management unit 3.

The communication system 100 shown in FIG. 1 is used in a conveyance system. The conveyance system may be provided in, for example, a semiconductor manufacturing plant with a plurality of processing devices (not shown) or an automated warehouse with a plurality of stacker racks (not shown).

In the communication system 100, a plurality of communication areas are defined. The communication system 100 includes, for each communication area, a plurality of traveling carts (traveling vehicles) 1, a plurality of access points 2, and a communication management unit (controller) 3. The number of communication areas is arbitrary and may be one, for example.

The maximum number $N_{max}$ of the traveling carts 1 included in each communication area is set in advance, taking into consideration, for example, unit communication time $t_0$ required for one communication between one traveling cart 1 and the communication management unit 3. The traveling cart 1 may move among the plurality of communication areas as it travels. Therefore, the number of the traveling carts 1 belonging to each communication area varies from 0 to $N_{max}$ as appropriate.

Each traveling cart 1 is a conveyance device that travels over a traveling area including a track 4. The track 4 is, for example, an overhead track suspended from the ceiling of the semiconductor manufacturing plant or the automated warehouse. The track 4 may alternatively be laid on the floor. The traveling cart 1 can be used, for example, to transport a FOUP or other object to be transported between the processing devices, the stacker racks, or the like. FOUP is an abbreviation for Front Opening Unify Pod.

The traveling cart 1 is, for example, an overhead traveling vehicle that travels along the track 4 suspended from the ceiling. In this form, the traveling cart 1 travels along the track 4 with its body (not shown) hanging below the track 4. The overhead traveling vehicle is configured, for example, as an OHT. OHT is an abbreviation for Overhead Hoist Transfer. However, the traveling cart 1 is not limited to this and can also be configured as, for example, an RGV, which is a tracked unmanned transport vehicle that travels along the track 4 provided on the floor. RGV is an abbreviation for Rail Guided Vehicle.

Furthermore, the traveling cart 1 may be configured as a trackless traveling cart, for example, an AGV which is an unmanned transport vehicle. AGV is an abbreviation for Automated Guided Vehicle. In this example, travel routes and a traveling area of the traveling cart are substantially defined by guiding tapes such as magnetic tapes attached to the floor surface or guide sections including barcodes or the like.

The traveling cart 1 as shown in FIG. 2 has a cart wireless communication unit (wireless communication unit) 11 and a cart control unit 12. The traveling cart 1 has a known computer built in. This computer includes a CPU, an HDD, a ROM, and a RAM or the like. The HDD, the ROM and the RAM constitute a cart storage unit (not shown) that stores various types of information related to wireless communication. The nonvolatile memory of the cart storage unit, including the HDD and the ROM, stores programs and the like to realize wireless communication. By the cooperation of the above hardware and software, the computer can be operated as the cart wireless communication unit 11 and the cart control unit 12.

The cart wireless communication unit 11 performs communication with the communication management unit 3 via wireless communication with the access point 2 in accordance with the prescribed wireless communication standards. As the wireless communication standards, for example, IEEE 802.11 or the like can be used, but is not limited to this, any wireless communication standard that uses management frames and the like in wireless communication is acceptable. Wireless communication can be realized by a wireless LAN that conforms to the wireless communication standards or the like, exemplified above.

The cart wireless communication unit 11 performs wireless communication with one access point 2, out of the plurality of access points 2, corresponding to a traveling position of the traveling cart 1. Wireless communication coverage areas of the plurality of access point 2 are different from each other. Therefore, in each communication area described below, the access point 2 with which the cart wireless communication unit 11 performs wireless communication may change according to the traveling position of the traveling cart 1 (roaming between the access points 2).

The cart control unit 12 controls wireless communication performed by the cart wireless communication unit 11 and instructs the cart wireless communication unit 11 on the communication channel, communication rate or the like, according to the traveling position of the cart itself. The cart control unit 12 acquires traveling position information indicating the traveling position of the cart itself in the traveling area, for example, by a position sensor or the like (not shown) attached to the traveling cart 1. This acquisition of traveling position information is performed, for example, as follows.

That is, a plurality of indicators (for example, barcodes or the like) are provided along with the track 4 which the traveling cart 1 travels along, and the cart control unit 12 of the traveling cart 1 may acquire the traveling position information of the traveling cart itself by identifying the indicator based on the information read by an indicator reader (not shown). Alternatively, reference marks (ID tags) are provided at predetermined intervals along the track 4 which the traveling cart 1 travels along, and the cart control unit 12 of the traveling cart 1 may acquire the traveling position information of the traveling cart 1 itself by computing the distance from the reference mark by counting wheel encoder outputs. Alternatively, the position sensor attached to the traveling cart 1 may include an optical receiver. In this form, a plurality of optical transmitters are provided along the track 4 which the traveling cart 1 travels along. In advance, the coordinates of each optical transmitter in the traveling area, in correspondence with the identification information of each optical transmitter, are stored in the cart storage unit. Each optical transmitter transmits an optical signal including the identification information to identify the optical transmitter itself. When the traveling cart 1 passes a predetermined position on the track 4, the position sensor (optical receiver) receives the optical signal transmitted from the optical transmitter. The cart control unit 12 of the traveling cart 1 acquires the traveling position information of the traveling cart itself by identifying the optical transmitter based on the received optical signal.

For the entirety of the communication system 100, the correspondence information between each traveling position within the traveling range and the communication channel, the communication rate or the like used for wireless communication performed at the traveling position are stored in the cart control unit 12 in advance.

Based on the traveling position information of the cart itself obtained as described above, the cart control unit 12 obtains information such as the communication channel and the communication rate from the stored correspondence information, and instructs the cart wireless communication unit 11 on the information. However, it is not limited to this, and the communication rate and other information may be obtained through wireless communication with the access point 2.

The access point 2 is connected to the communication management unit 3 via a wired LAN 5 that uses LAN cables, and performs wired communication with the communication management unit 3. The wired LAN 5 may be equipped with an appropriate number of switching hubs (not shown) or other devices.

The access point 2 performs wired communication with the communication management unit 3 and forms a wireless network around itself. The access point 2 can perform wireless communication with the traveling cart 1 that exists in the wireless communication area around the access point 2 itself.

In the communication system 100 of this example, a plurality of access points 2 are provided along the track 4 so that the entirety of the traveling area in which the traveling cart 1 travels is covered by the wireless communication coverage areas of those access points 2.

In this example, each of the access point 2 has preset information on which position the traveling cart 1 is the target of wireless communication by the access point 2, in the traveling area of the traveling cart 1 included in the wireless communication coverage area. In particular, regarding a part where the wireless communication coverage areas of two access points 2 overlaps, the access point 2 which takes charge of each position in the traveling area included in the overlapped part is defined in advance.

In this example, the correspondence relationship between each position of the traveling cart 1 and the access point 2 that performs wireless communication with the traveling cart 1 is predetermined. Therefore, it is possible to create in advance the above correspondence information between each position within the traveling range, and the communication channel and the communication rate used in wireless communication or the like.

The communication management unit 3 is a computer used to manage each of the predetermined number or less of traveling carts 1. The communication management unit 3 determines to assigns each of a plurality of transport tasks to which of the plurality of traveling carts 1 that are managed and determines the travel route for each of the traveling carts 1 and the like. The transport tasks are given by a transport management unit 6 or the like in upper layer shown in FIG. 1.

The transport management unit 6 comprehensively controls the conveyance system to which the communication system 100 is applied. The transport management unit 6 includes one or more computers and performs various controls associated with transport management.

The plurality of communication management units 3 managed by the transport management unit 6 are, for example, as shown in FIG. 1, connected to each other via the wired LAN 5 so that they can communicate with each other. The communication management unit 3 may be configured not to be directly connected to each other and to communicate with each other via the transport management unit 6.

The communication management unit 3 is, for example, configured as a known computer having a CPU, a ROM, a RAM, an HDD and the like which are not shown. The ROM, the RAM, and the HDD store various programs and data related to management.

The communication management unit 3 performs wireless polling communication via the access point 2 to inquire in turn to the plurality of traveling carts 1 in the communication area under its jurisdiction. The plurality of access points 2 in the communication system 100 may perform wireless communication using the same communication channel. In this example, the distance between the plurality of access points 2 using the same communication channel should be set sufficiently large to prevent interference in communication, and if there is no possibility of interference in communication among those plurality of access points 2, in the polling communication performed via those access points 2, other access points 2 need not be considered. That is, the access point 2 executes wireless polling communication at polling cycle T.

On the other hand, if there is a possibility of communication interference among the plurality of access points 2 using the same communication channel, the polling cycle T is divided. For example, when four access points 2 perform wireless communication using the same communication channel, and there is a possibility of communication interference among those four access points 2, the polling cycle T is divided into four. In other words, the polling period divided into four is allocated to each of the four access points 2. Hereafter, the period allocated in this manner may be referred to as the allocation period Ta. Each access point 2 performs wireless polling communication within the allocation period Ta allocated to itself. Therefore, the allocation period Ta can be considered to refer to the period during which the communication management unit 3 can perform wireless polling communication via each access point 2, between the traveling carts 1 under the access point 2.

The length of the allocation period Ta is set based on the above unit communication time $t_0$ and the maximum number $N_{max}$ of the traveling carts 1 in the communication area where the access point 2 takes charge of. The length of the allocation period Ta can be, for example, the product of the unit communication time $t_0$ and the maximum number $N_{max}$ of the traveling carts 1. That is, $Ta=t_0 \times N_{max}$. Accordingly, this ensures that the time necessary for wireless polling communication, regardless of number of the traveling carts 1 are present in the communication area. When the polling cycle T is divided according to the number of access points 2, the divided polling cycle (i.e., the allocation period Ta) must satisfy this condition.

For each access point 2, within each polling cycle T, the communication management unit 3 inquires a plurality of traveling carts 1 that exist in the communication area of that access point 2 in turn, and performs the communication. This polling communication is performed wirelessly via the access point 2. After completing communication with each traveling cart 1 within one polling cycle T (strictly speaking, within the allocation period Ta), the communication management unit 3 waits without performing the wireless polling communication with the traveling cart 1 until the next polling cycle T (the allocation period Ta) comes.

Each of the traveling cart 1 traveling on the track 4 within the communication area of the communication system 100 is pre-registered with the communication system 100 in advance. This registration will be described later.

The following is a configuration where the traveling cart 1 moves from one communication area to another as it travels (roaming between communication areas of different communication management units 3). The communication management unit 3 that has a jurisdiction over the communication area from which the traveling cart 1 exists before it moves is called a first communication management unit, and the other communication management unit that has a jurisdiction over the communication area of a movement destination is called a second communication management unit.

The first communication management unit transmits the identification information of the traveling cart 1 leaving the communication area under its jurisdiction to the second communication management unit via the wired LAN 5. At about the same time, the first communication management unit deletes the identification information of the traveling cart 1 leaving the communication area under its jurisdiction from the list of objects of the wireless polling communication stored in the memory unit. Accordingly, the traveling cart 1 is no longer included in the objects of the next and subsequent wireless polling communication by the first communication management unit. The second communication management unit adds the identification information of the traveling cart 1 received from the first communication management unit to the list of objects of the wireless polling communication. Accordingly, this will cause the traveling cart 1 to be included in the objects of the next and subsequent wireless polling communication by the second communication management unit.

Then, when adding a new traveling cart (new traveling vehicle) 1a which is a new additive traveling cart 1 to the existing conveyance system, the method to accept the new traveling cart 1a as an object of the wireless communication in the communication system 100 will be described. When the communication system 100, which is already performing wireless communication with some traveling carts 1, additionally accepts a new traveling cart 1a as the object of wireless communication, this acceptance sometimes called "communication-entry." In this example, with the communication-entry, the presence of the new traveling cart 1a is recognized by the communication system 100 (one of the communication management unit 3 and the transport management unit 6), and various processes are performed to enable wireless communication with the new traveling cart 1a.

In the communication system 100 of this example, a cart addition position 10 which is a dedicated position for adding a new traveling cart 1a is provided. The cart addition position 10 can be set arbitrarily, but as shown in FIG. 1, for example, it is preferable to set it at a position that does not interfere with the travel of the existing traveling carts 1. It is also possible to add the new traveling cart 1a at any position on the track 4 without providing the cart addition position 10 dedicated specially.

After placing the new traveling cart 1a at the cart addition position, the operator performs a new traveling cart communication-entry operation (acceptance command) to the transport management unit 6, as shown in FIG. 3. The new traveling cart communication-entry operation is an operation that instructs to add the new traveling cart 1a. The specific operation may include, for example, the operator clicking on a menu or icon that instructs a new cart communication-entry in the transport management unit 6. However, it is not limited to this.

When the new traveling cart communication-entry-entry operation is performed, the transport management unit 6 recognizes the existence of the new traveling cart 1a that needs the communication-entry. The transport management unit 6 sends a communication-entry instruction for the communication-entry of the new traveling cart 1a, to the communication management unit 3 which has a jurisdiction over the communication area that includes the cart addition position.

When the communication management unit 3 receives the communication-entry instruction from the transport management unit 6 for the new traveling cart 1a, the communication management unit 3 in the next polling cycle T acquires the free time in the allocation period Ta allocated to the access point 2 which has the area that includes the cart addition position 10. The free time is time during wireless polling communication is practically not performed. The free time is exemplified in FIGS. 3 and 4. In FIG. 4, the communication area A is the communication area that includes the new traveling cart 1a.

Wireless polling communication to the traveling cart 1 starts almost simultaneously with the start of the allocation period Ta. If there are a plurality of traveling carts 1 in the communication area under the jurisdiction, wireless polling communication is performed one by one with different traveling cart 1 as shown in FIG. 3 in simplified form. The free time in the allocation period Ta means the free time until the end of the allocation period Ta after the access point 2 in the area that includes the cart addition position 10 has completed the wireless polling communication with all of the traveling cart 1 (the wireless polling communication corresponds to the total polling period in FIG. 4). The free time varies depending on the number of traveling cart 1 under the jurisdiction of the access point 2, shorter if there are more traveling carts 1, and longer if there are fewer. At the timing when wireless polling communication with all of the traveling carts 1 in the communication area under its jurisdiction is completed, the communication management unit 3 calculates the free time based on the current time and the time when the allocation period Ta will end.

The communication management unit 3 compares the free time calculated as above with the predetermined required connection time (predetermined time) and determines whether or not the connection sequence for the new traveling cart 1a can be completed within the free time (connection availability determination step). This required connection time is the time required from the start of the connection sequence for accepting the new traveling cart 1a into the communication system 100 until it is completed.

If the above judgment indicates that the free time is longer than or equal to the required connection time, the communication management unit 3 immediately executes the connection sequence (wireless communication object addition step).

The connection sequence will be described in detail below. As shown in FIG. 3, the communication management unit 3 transmits a beacon containing the predetermined information via (or, more precisely, instructs) the access point 2 and by broadcast within the wireless communication coverage area centered on the access point 2. The information described in the beacon includes information necessary for communication such as the identification information (for example, MAC address) of the access point 2. The information necessary for communication may include other information such as communication rate.

The new traveling cart 1a, which is located within the wireless communication coverage area, receives the beacon broadcast from the access point 2, and sets up the wireless communication settings by storing information of the access point 2 information (identification information or the like) contained in the beacon.

Then, the new traveling cart 1a transmits a communication-entry response describing its own cart information for wireless communication to the communication management unit 3 via wireless communication with the access point 2. The access point 2, which receives the communication-entry response, stores the information of the new traveling cart 1a contained in the communication-entry response and transmits the information to the communication management unit 3. The communication management unit 3 stores the information of the new traveling cart 1a so that the new traveling cart 1a is added as the object of the wireless polling communication. That is, information about the wireless communication of the new traveling cart 1a is added to the list of objects of the wireless polling communication in the communication management unit 3. The information includes, for example, identification information such as the MAC address of the new traveling cart 1a.

The communication management unit 3 transmits the received information of the new traveling cart 1a to the transport management unit 6. The transport management unit 6 stores the information of the new traveling cart 1a received from the communication management unit 3. In this way, the existence of the new traveling cart 1a is recognized by the communication system 100.

In the above manner, the communication-entry of the new traveling cart 1a into the communication system 100 is completed. In the next polling cycle T (allocation period Ta), the communication management unit 3 performs wireless polling communication to the plurality of traveling carts 1 including the new traveling cart 1a in turn via the access point 2.

As shown in FIGS. 3 and 4, the start timing of the connection sequence is automatically adjusted so that wireless communication associated with the connection sequence do not conflict with wireless polling communication. Thus, interference with wireless polling communication by sending and receiving beacons can be avoided.

On the other hand, if the free time is determined to be shorter than the required connection time in the above judgment, the communication management unit 3 does not execute the connection sequence for the new traveling cart 1a and waits until the next polling cycle T starts. Then, the communication management unit 3 again determines whether or not there is enough free time in the next polling cycle T (allocation period Ta). The communication management unit 3 continues to iteratively execute the above process until the communication-entry of the new traveling cart 1a is completed.

As described above, the communication-entry method (i.e., the wireless communication acceptance method) of this example autonomously finds the communication-entry timing of the new traveling cart 1a based on the new traveling cart communication-entry operation. Therefore, seamless introduction of the new traveling cart 1a is realized. In addition, by using the communication-entry method of this example, the information of the wireless communication object can be acquired and registered through wireless communication performed on the spot. Therefore, compared to methods such as having the identification information of the new traveling cart 1a manually input into the transport management unit 6 by the operator, erroneous registration due to mistakes can be avoided. In addition, the beacon for the communication-entry of the new traveling cart 1a can be prevented from being transmitted while wireless polling communication with the existing traveling cart 1 is in progress. Thus, interference with wireless polling communication due to the transmission and reception of beacons can be avoided. In addition, this communication-entry method of this example is also applicable when each of the traveling carts 1 traveling on the track 4 within the communication range of the communication system 100 is registered with the communication system 100 before operation so that it can reduce the workload of operators when introducing the communication system.

As described above, the wireless communication acceptance method of this example is the method of accepting the new traveling cart 1a as the object of wireless communication into the communication system 100. The communication system 100 includes the communication management unit 3, the access point 2, and a plurality of traveling carts 1. The access point 2 is connected to the communication management unit 3. Each of the plurality of traveling carts 1 includes the cart wireless communication unit 11. The communication system 100 performs wireless polling communication between the communication management unit 3 and the plurality of traveling carts 1 via the access point 2 at each predetermined polling cycle T. The wireless communication acceptance method performs processes including the wireless communication object addition step. In the wireless communication object addition step, the connection sequence for accepting the new traveling cart 1a into the communication system 100 is performed within the free time (see FIG. 4) which is the time after the wireless polling communication between the communication management unit 3 and the plurality of traveling carts 1 is completed and until the end of the period during which the wireless polling communication is possible, in the polling cycle.

Thus, by performing the connection sequence for the new traveling cart 1a during the free time when the wireless polling communication is not performed, the influence of the execution of the connection sequence on the wireless polling communication can be eliminated. It is also possible to have the communication system 100 accept the new traveling cart 1a with a simple operation.

The wireless communication acceptance method performs the process including the connection availability determination step for determining whether or not the free time is longer than or equal to predetermined time. If it is determined that the free time is longer than or equal to the predetermined time in the connection availability determination step, the wireless communication object addition step is performed. If in the connection availability determination step it is determined that the free time is shorter than the predetermined time, the wireless communication object addition step is not performed.

Accordingly, this can ensure that the performance of the connection sequence does not interfere with the wireless polling communication.

In the wireless communication acceptance method, in the wireless communication object addition step, the communication management unit 3 wirelessly transmits the beacon to start the connection sequence via the access point 2 within the free time.

Accordingly, this eliminates the need to input information for wireless communication (e.g., MAC address of the access point 2) into the new traveling cart 1a in advance. Thus, input errors can be avoided and the operator's workload can be reduced.

In the wireless communication acceptance method, in the wireless communication object addition step, the communication management unit 3 transmits the beacon to start the connection sequence in response to the new traveling cart communication-entry operation input by the operator.

Accordingly, this can avoid wasted transmissions in the absence of the new traveling cart 1a since the beacons are not transmitted in the absence of the operation by the operator.

Figure 5:
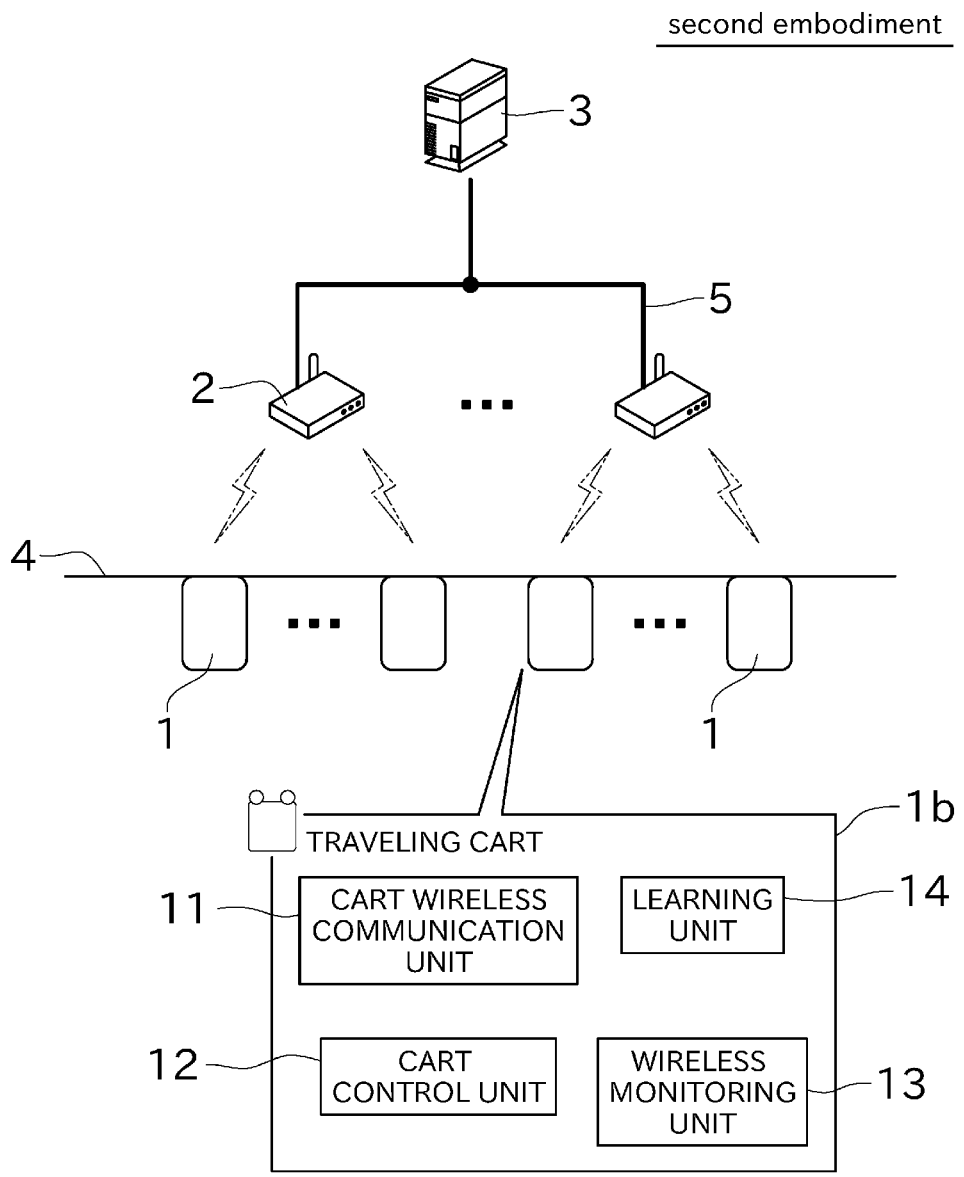
FIG. 5 is a schematic diagram showing the relationship between the communication management unit, the access points, and the traveling carts in a second example.
Figure 6:
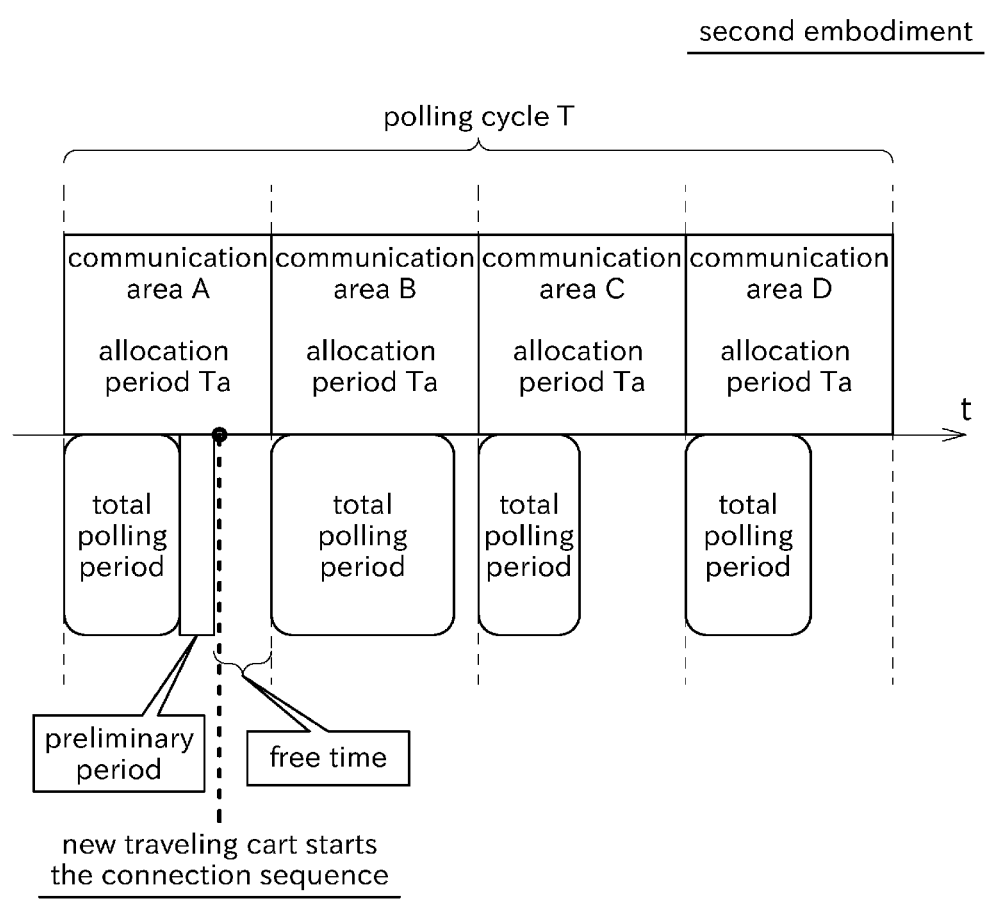
FIG. 6 is a diagram showing the relationship between the free time predicted and the start timing of the connection sequence in the second example.

Next, a second example will be described. FIG. 5 is a schematic diagram showing the relationship between the communication management unit 3, the access points 2, and the traveling carts 1 in the second example. FIG. 6 is a diagram showing the relationship between the free time predicted by the new traveling cart 1b and the start timing of the connection sequence. In a description of this example, members identical or similar to those of the above-described example are given the same corresponding reference numerals on the drawings, and descriptions thereof may be omitted.

In the communication system 100 of this example, for the communication-entry of the new traveling cart 1b, the access point 2 does not transmit the beacon by broadcasting. Instead, the new traveling cart 1b, which is scheduled to perform the communication-entry for entering into the communication system 100, transmits a beacon by broadcasting to request acceptance.

As shown in FIG. 5, the new traveling cart 1b (i.e., traveling cart 1) includes a wireless monitoring unit 13, and a learning unit 14, in addition to the cart wireless communication unit 11 and the cart control unit 12.

The new traveling cart 1b is equipped with a built-in known computer. By the cooperation of the hardware and software provided by the computer, the computer can be operated as the wireless monitoring unit 13 and the learning unit 14.

The wireless monitoring unit 13 monitors the communication channel indicated by the cart control unit 12 and acquires information such as wireless communication packets and reception strength in that communication channel. The wireless monitoring unit 13 outputs the acquired information to the learning unit 14. The cart control unit 12 instructs the communication channel of the access point 2 corresponding to the traveling position of the new traveling cart 1b to the wireless monitoring unit 13 in advance. By monitoring the communication channel, the wireless monitoring unit 13 can identify the communication status of the communication management unit 3 via the access point 2 in its vicinity. In other words, when the new traveling cart 1b is within the communication range of the access point 2 predetermined, the wireless monitoring unit 13 of the new traveling cart 1b monitors the communication channel of the access point 2 and identifies its communication status.

The learning unit 14 analyzes (learns) wireless communication packets or the like to predict the time (free time) when the communication management unit 3 does not perform wireless polling communication during each polling cycle T (strictly speaking, within the allocation period Ta) (free time estimation step). The learning unit 14 outputs the free time predicted to the cart control unit 12.

By the way, if the monitoring period of the communication channel by the wireless monitoring unit 13 includes only a part of the polling cycle T, the number N of the traveling carts 1 targeted for wireless polling communication performed in the communication area cannot be correctly acquired from the wireless communication packets obtained in the monitoring. Therefore, the period during which wireless communication is monitored by the wireless monitoring unit 13 must be defined long enough to include the entire period of at least one polling cycle T. For example, the length of the monitoring period for wireless communication may be defined to be at least twice as long as the polling period T. Accordingly, this allows the learning unit 14 to accurately acquire the number of the traveling carts 1 which are the objects of the wireless polling communication from the communication packets received by the wireless monitoring unit 13. The length of the monitoring period of wireless communication by the wireless monitoring unit 13 may be changed dynamically as appropriate depending on the number of traveling carts 1 in each communication area and the length of the polling cycle T (the allocation period Ta).

Based on the number of times wireless polling communication has been performed by the communication management unit 3, the learning unit 14 can acquire the number of the traveling carts 1 in the communication area where the new traveling cart 1b is scheduled to be put in place. The learning unit 14 can, for example, analyze the unique identifier such as the MAC address of the traveling cart 1 contained in the captured wireless communication packets to acquire the number of times wireless polling communication has been performed by the communication management unit 3. After acquiring the number of the traveling carts 1, the learning unit 14 calculates the unit communication time $t_0$ per traveling cart 1. There are several possible methods for calculating the unit communication time $t_0$. For example, the unit communication time $t_0$ can be calculated by dividing actual communication time (the total polling period) by the number of the traveling carts in the communication area. The actual communication time is time required for the communication management unit 3 to perform wireless polling communication to all the traveling cart 1 in the communication area where the new traveling cart 1b is to be introduced. The start and end timings of the total polling period can be obtained based on the monitoring results of the wireless monitoring unit 13.

Due to the roaming between the communication areas described above, the traveling cart 1 may move into the area from another communication area between the polling cycle T and the next polling cycle T. The occurrence of this roaming cannot be known in advance, but even if it does occur, there is a practical upper limit to the number of traveling carts 1 to be increased by switching once the polling cycle T. This is because a design upper limit is set for the number of traveling carts 1 that can be controlled by the communication management unit 3 within the communication area. Therefore, the learning unit 14 obtains a preliminary period by subtracting the number of traveling carts 1 controlled in the communication area from this upper limit number and multiplying the number by the unit communication time $t_0$. The upper limit number is set in advance and stored in the new traveling cart 1b.

The learning unit 14 further acquires the allocation period Ta of the access point 2 responsible for the communication area where the new traveling cart 1b will be introduced, from the monitoring results of the wireless monitoring unit 13. The allocation period Ta can be acquired based on the timing when this access point 2 starts wireless polling communication in the polling cycle T and, after the end of this wireless polling communication, the timing when the other access point 2 starts wireless polling communication to other communication areas. However, the acquisition of the allocation period Ta by this method is premised on the fact that in FIG. 6, not only in communication area A, but also in communication area B, the wireless polling communication is performed in the monitoring channel of the wireless monitoring unit 13, and the fact that the new traveling cart 1b is able to intercept wireless polling communication in both communication area A and communication area B.

The information on the allocation period Ta may be stored in advance on the new traveling cart 1b. In this example, the estimation of the allocation period Ta by the learning unit 14 is unnecessary.

The learning unit 14 then estimates the free time in the next polling cycle T by subtracting the total polling time and further subtracting the preliminary period from the allocation period Ta. Furthermore, the learning unit 14 compares this free time with the required connection time to determine whether the connection sequence for the new traveling cart 1b can be completed within the free time (connection availability determination step).

If the free time is longer than or equal to the required connection time, the cart control unit 12 determines the timing when itself will send the beacon indicating the request of the communication-entry to enter the wireless communication of the communication system 100 in the next polling cycle T.

The transmission timing of the beacon (the connection sequence start timing) is determined based on the analysis results input from the learning unit 14. Specifically, the transmission timing of the beacon is calculated by using the timing, when the access point 2 responsible for the communication area into which the new traveling cart 1b will be introduced completes wireless polling communication with all the traveling cart 1 under its jurisdiction in the current polling cycle T, as a starting point. Specifically, the transmission timing of the beacon is calculated by adding a preliminary period to this starting point, taking into account that the traveling cart may move into the area from other communication areas.

The transmission timing of the beacon can also be calculated by using the end of the allocation period Ta in the current polling cycle T as the starting point. In this example, the transmission timing of the beacon is a point in time goes back the time required to complete the connection sequence from the end of the allocation period Ta.

On the other hand, if the free time is shorter than the required connection time, the cart control unit 12 does not instruct the cart wireless communication unit 11 to transmit the beacon. In this example, the wireless monitoring unit 13 continues to monitor the wireless communication, and the learning unit 14 again performs the connection availability determination based on the monitoring results in the new polling cycle T. The above process is repeated until the free time becomes longer than or equal to the required connection time.

The wireless monitoring unit 13 monitors wireless communication in real time and outputs the acquired wireless communication packets to the learning unit 14. Therefore, the determination can be made on whether or not the new traveling cart 1b can be connected, in accordance with the current situation.

Figure 7:
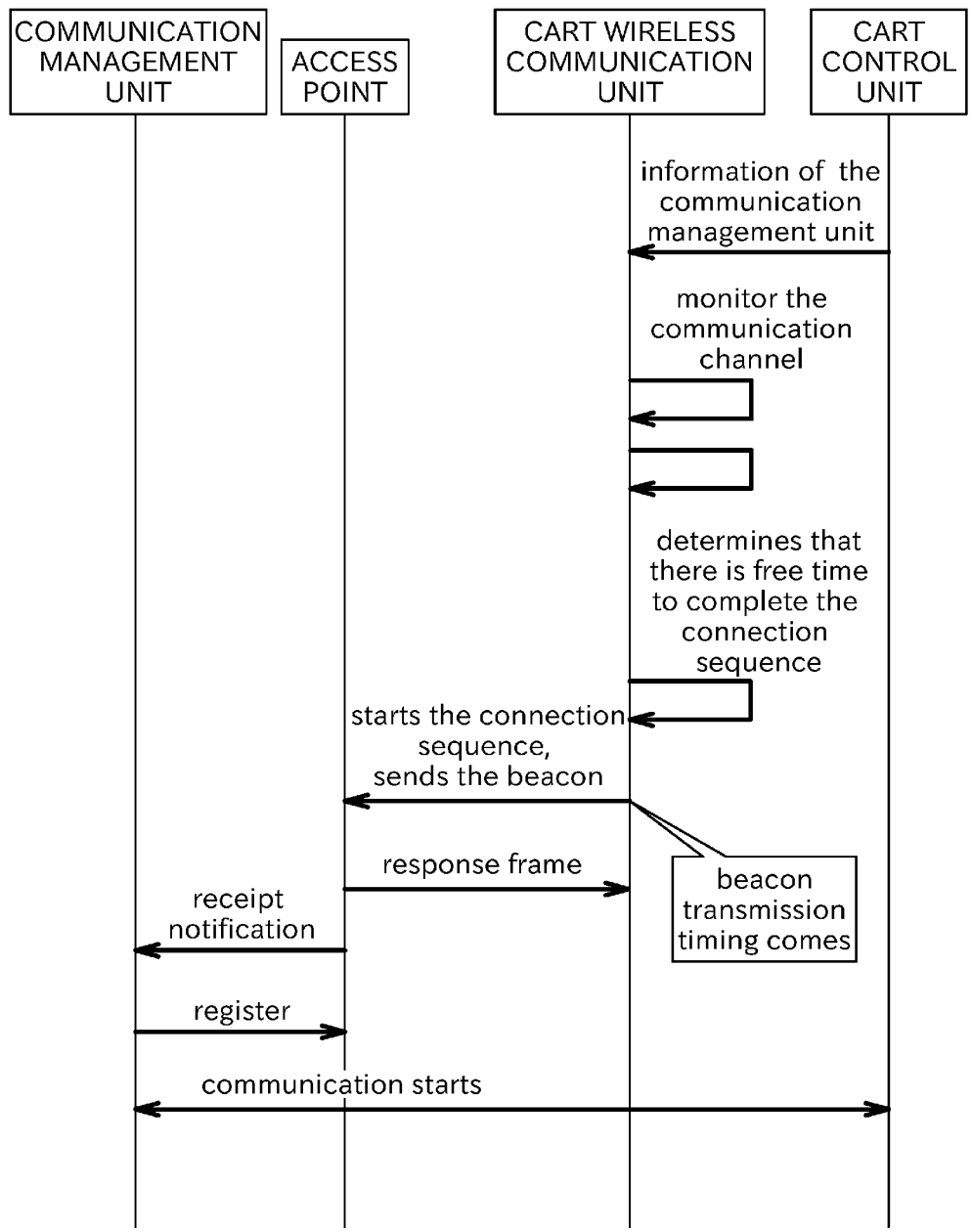
FIG. 7 is a diagram showing an example of the connection sequence of the second example.

Next, an example of the connection sequence performed by the traveling cart 1 to enter the communication system 100 is briefly described with reference to FIG. 7. FIG. 7 shows an example of the connection sequence of the second example.

After the new traveling cart 1b is placed in the cart addition position, as shown in FIG. 7, the cart control unit 12 outputs the information of the communication management unit 3 that has a jurisdiction over the communication area where the new traveling cart 1b is to be introduced (or the information of the access point 2 via which the communication management unit 3 communicates) to the cart wireless communication unit 11. Such information includes, for example, the identification information of the communication management unit 3 or the access point 2, the communication channel or the like.

The cart wireless communication unit 11 continuously monitors the communication channel via the wireless monitoring unit 13. If it is determined that there is the free time $t_0$ complete the connection sequence as described above, at the start timing of the connection sequence indicated by the cart control unit 12, the cart wireless communication unit 11 transmits the beacon by broadcasting. This beacon includes identification information (for example, MAC address) of the new traveling cart 1b.

The access point 2 that received the beacon transmits the response frame to the new traveling cart 1b. Furthermore, the access Point 2 transmits the beacon received from the new traveling cart 1b (or the information on the new traveling cart 1b included in the beacon) to the communication management unit 3.

By storing the information of the new traveling cart 1b contained in the beacon, the communication management unit 3 registers this new traveling cart 1b as an object of wireless polling communication. Then, the communication management unit 3 transmits the information of the new traveling cart 1b to the transport management unit 6.

In this way, by registering the information of the new traveling cart 1b to be entered at the access point 2, the communication management unit 3, and the transport management unit 6, the communication-entry of the new traveling cart 1b is completed. As a result, communication between the communication management unit 3 and the new traveling cart 1b via the access point 2 can be started.

As described above, in the wireless communication acceptance method of this example, in the wireless communication object addition step, the new traveling cart 1b wirelessly transmits the beacon to start the connection sequence within the free time.

Accordingly, this eliminates the need to input information for wireless communication (for example, identification information of the new traveling cart 1b) to the access point 2 or the communication management unit 3 in advance. Thus, input errors can be avoided and the operator's workload can be reduced.

In the wireless communication acceptance method of this example, the new traveling cart 1b performs processes including the free time estimating step. In the free time estimating step, the new traveling cart 1b intercepts the wireless polling communication between the communication management unit 3 and the plurality of traveling carts 1, and estimates the free time.

Accordingly, the new traveling cart 1b can estimate the free time within which the wireless polling communication is not in progress. Thus, during the time when the wireless polling communication is not in progress, the new traveling cart 1b can transmit the beacon for entering to wireless communication. In other words, the wireless polling communication can avoid being interfered with by the transmission of the beacon.

Although preferred examples have been described above, the configurations described above may be modified as follows, for example.

In the first example, the execution of the above connection sequence regarding the communication-entry of the new traveling cart 1a (e.g., determination of the time of the beacon transmission and the like) may be performed by the control unit provided by the access point 2.

In the first example, a sensor may be provided to detect whether or not the new traveling cart 1a is present, at the cart addition position 10 predetermined for the addition of the new traveling cart 1a. In this instance, instead of the new traveling cart communication-entry operation that is performed manually by the operator, based on the detection result of the above sensor, it can be automatically determined whether or not the new traveling cart 1a needs to be accepted into the communication system 100. In this configuration, the sensor detection result indicating the presence of the new traveling cart 1a is transmitted to the transport management unit 6 as an acceptance command instead of the new traveling cart communication-entry operation.

In the first and second examples, if the free time is longer than or equal to the required connection time in each polling cycle T, the communication management unit 3 or the traveling cart 1 may transmit the beacon spontaneously.

In the first and second examples, instead of the free time, it is possible to determine whether or not to execute the connection sequence for the new traveling cart 1a, 1b based on a free number obtained by subtracting the number of the traveling carts that actually exist from the maximum number $N_{max}$ of traveling carts 1 that can communicate in the communication area.

In the first and second examples, instead of free time, it is possible to determine whether or not to execute the connection sequence by comparing the total polling period with a preset threshold time. Specifically, if the total polling period is shorter than or equal to the threshold time, the connection sequence is executed. The threshold time can be set based on, for example, the allocation period Ta and the execution time of the connection sequence.

In the first and second examples, when one polling cycle T is divided into two or more and assigned to each communication management unit 3, it may be divided equally or unequally.

The timing and length of the allocation period Ta may change dynamically during the operation of the communication system 100. In the first example, it is easy to obtain the free time even if the allocation period Ta changes dynamically. In the second example, if the timing and length of the allocation period Ta in the next polling cycle T can be predicated by some form, the free time can be estimated based on it.

If the number of communication areas is small (for example, one), it is possible not to divide one polling cycle T but the whole of it is used as one allocation period Ta. In addition, it is possible to use only one channel for wireless polling communication instead of multiple channels.

In the second example, the new traveling cart 1b can acquire the communication channel to be monitored by using the wireless monitoring unit 13 (or the cart wireless communication unit 11) to scan the communication channels.

In the new traveling cart 1b of the second example, the wireless monitoring unit 13 may monitor the utilization of the communication channel without capturing wireless communication packets. In this instance, for example, if the communication channel utilization is below a threshold value close to zero, it can be determined that wireless polling communication is not taking place.

In the second example, the monitoring period of the wireless monitoring unit 13 may be defined to include all of two or more polling periods T. In this instance, the learning unit 14 can obtain the total polling period for each polling period T. By obtaining an additive average of multiple total polling periods, the obtained average value can be used, for example, to determine the timing of the beacon transmission. The length of the preliminary period can also be adjusted according to a value (e.g., variance) indicating the variation of the total polling periods.

The invention claimed is:

1. A wireless communication acceptance method of accepting a new traveling vehicle as an object of wireless communication into a communication system comprising a controller, an access point connected to the controller, and a plurality of traveling vehicles each including a wireless communication unit, the communication system performing wireless polling communication between the controller and the plurality of traveling vehicles via the access point at each predetermined polling cycle, comprising:
   performing a process including a wireless communication object addition step;
   in the wireless communication object addition step, performing a connection sequence for accepting the new traveling vehicle into the communication system; and
   performing the connection sequence accompanying wireless communication within free time which is time after the wireless polling communication between the controller and the plurality of traveling vehicles is completed and until an end of a period during which the wireless polling communication is possible, in the polling cycle.

2. The wireless communication acceptance method according to claim 1, wherein
   a process including a connection availability determination step of determining whether or not the free time is longer than or equal to predetermined time is performed,
   if it is determined that the free time is longer than or equal to the predetermined time in the connection availability determination step, the wireless communication object addition step is performed, and
   if it is determined that the free time is shorter than the predetermined time in the connection availability determination step, the wireless communication object addition step is not performed.

3. The wireless communication acceptance method according to claim 1, wherein, in the wireless communication object addition step, the controller wirelessly transmits a frame to start the connection sequence via the access point within the free time.

4. The wireless communication acceptance method according to claim 3, wherein, in the wireless communication object addition step, the controller transmits the frame to start the connection sequence depending on an acceptance command input by an operator.

5. The wireless communication acceptance method according to claim 1, wherein, in the wireless communication object addition step, the new traveling vehicle wirelessly transmits a frame to start the connection sequence within the free time.

6. The wireless communication acceptance method according to claim 5, wherein the new traveling vehicle performs a process including a free time estimating step in which the new traveling vehicle intercepts the wireless polling communication between the controller and the plurality of traveling vehicles and estimates the free time.

7. A communication system comprising a controller, an access point connected to the controller, and a plurality of traveling vehicles each including a wireless communication unit, wherein
   the controller performs wireless polling communication via the access point at each predetermined polling cycle with a predetermined number of vehicles under its jurisdiction,
   a connection sequence accompanying wireless communication is performed to accept wireless communication with a new traveling vehicle that is not included in the plurality of traveling vehicles that are objects of the wireless polling communication, and
   in the polling cycle, the connection sequence is performed within free time which is time after the wireless polling communication between the controller and the plurality of traveling vehicles via the access point is completed and until an end of the polling cycle.

\* \* \* \* \*